United States Patent [19]

Raehse et al.

[11] Patent Number: 5,615,492
[45] Date of Patent: Apr. 1, 1997

[54] DRYING OF WATER-CONTAINING USEFUL MATERIALS OR MIXTURES THEREOF WITH SUPERHEATED STEAM

[75] Inventors: Wilfried Raehse, Duesseldorf; Gunter Effey, Monheim; Wilhelm Beck, Duesseldorf, all of Germany

[73] Assignee: Henkel Kommanditgesellschaft auf Aktien, Duesseldorf, Germany

[21] Appl. No.: 569,176
[22] PCT Filed: Jun. 18, 1994
[86] PCT No.: PCT/EP94/01987
  § 371 Date: Feb. 23, 1996
  § 102(e) Date: Feb. 23, 1996
[87] PCT Pub. No.: WO95/00222
  PCT Pub. Date: Jan. 5, 1995

[30] Foreign Application Priority Data

Jun. 26, 1993 [DE] Germany ............... 43 21 361.8

[51] Int. Cl.[6] ................................. F26B 21/06
[52] U.S. Cl. ............. 34/73; 159/48.1; 159/16.3; 203/49; 203/90; 34/77; 34/408
[58] Field of Search ........... 203/49, 90; 202/236; 159/48.1, 16.3; 34/77, 408, 73

[56] References Cited

U.S. PATENT DOCUMENTS 2,911,036 11/1959 Lazar et al. ............... 159/4.01
3,620,776 11/1971 Mishkin et al. ............... 34/288
3,633,283 1/1972 Mishkin et al. ............... 34/73
3,895,994 7/1975 Saguchi et al. ............... 159/4.01

FOREIGN PATENT DOCUMENTS

WO9205849 4/1992 WIPO.

Primary Examiner—Henry A. Bennett
Assistant Examiner—Dinnatia Doster
Attorney, Agent, or Firm—Ernest G. Szoke; Wayne C. Jaeschke; Real J. Grandmaison

[57] ABSTRACT

A process for drying water-containing materials in a closed-circuit system using a vertical drying tower having inlets located at a lower portion of the tower, the inlets circulating superheated steam in countercurrent to the water-containing materials descending through the vertical drying tower thereby drying the water-containing materials, the improvement being:

(a) providing an auxiliary fluid having a temperature below that of the superheated steam entering into the vertical drying tower;

(b) providing a double jacket having a permeable inner wall wherein the double jacket surrounds the lower portion of the vertical drying tower below the inlets; and (c) introducing the auxiliary fluid through the permeable inner wall of the double jacket and into the vertical drying tower in a tangential or radial direction relative to the permeable inner wall.

20 Claims, No Drawings

DRYING OF WATER-CONTAINING USEFUL MATERIALS OR MIXTURES THEREOF WITH SUPERHEATED STEAM

BACKGROUND OF THE INVENTION

1. Field of the Invention

This invention relates to a process for drying water-containing useful materials or mixtures thereof, more particularly with high sensitivity to heat and preferably with a suitability as—or for use in—wetting agents, detergents and/or cleaning products, in a vertical tower using superheated steam circulating in countercurrent to the descending material to be dried as the drying gas.

2. Discussion of Related Art

The drying of aqueous preparations of useful materials and mixtures of useful materials suitable as wetting agents, detergents and/or cleaning products with superheated steam as the drying gas is known from Applicants' International patent application WO 92/5849. The advantages of this method of drying over conventional spray drying using hot air as the drying gas lie on the one hand in the absence of oxygen so that the problems involved in the drying of purely organic or substantially organic useful materials, for example corresponding surfactants based on natural materials, for example oxidative damage or the risk of fire, are avoided. Circulation of the drying gas provides for operation in the virtual absence of waste gases. Other advantages attributable inter alia to the fundamental differences in the drying gas can be found in the cited document.

Circulation of the drying gas to enable the drying process to be carried out in the absence of waste gases means that the installation has to be closed. The presence of extraneous air in conventional spray drying with hot air or hot combustion gases as the drying gas would not be possible here or at least would be inappropriate. Accordingly, the closed construction of the drying installation operated with superheated steam leads to a virtually flow-free space below the lowermost superheated steam inlets, inside which the temperature substantially corresponds to the entry temperature of the superheated steam. The walls in the lower part of the drying tower also have this temperature unless special precautions are taken.

Numerous products intended for drying, more particularly organic products, have tacky properties after drying or at least pass through an adhesive phase during the drying process. Accordingly, the completely or partly dried particles cake on the one hand together and, on the other hand, on the inner wall of the tower in the substantially flow-free space situated beneath the superheated steam inlets. This effect is intensified by the relatively long residence time of the particles in that space. Thermal damage to the particles caking on the hot walls of the tower is unavoidable.

In conventional spray drying using hot air as the drying gas, the problem is solved by rapid discharge of the product through a permanently open channel at the lower end of the drying tower. This solution is not applicable to drying with a circulated drying gas which is carried out in the substantial absence of waste gases.

The problems caused by the caking of thermoplastic materials and sugar-containing foods on the tower walls of spray dryers is known from the prior art (K. Kröll, Trocknungstechnik, Vol. 2, Trockner und Trocknungsverfahren (Dryers and Drying Processes), 2nd Edition 1978, Springer Verlag, page 294). Materials of this type remain soft and tacky towards the end of drying even at moderately high temperatures. To solve this problem, the walls of the dryers used for such materials are provided with air-permeated casings or, alternatively, cleaning jets are allowed to rotate inside the drying tower and blow away the powder with cold air. It is also known that a cool and moisture-free airstream can be introduced into the dryer in such a way that it sweeps along the inside of the walls in the form of a downwardly directed curtain of cold air. The introduction of cold air or a curtain of cold air takes place at the lower end of the cylindrical drying tower, especially for the normally conical discharge funnel. The cold air is introduced into the interior of a double jacket through a ring channel arranged in the attachment zone of the cone and an air distributor plate, the inner wall of the double jacket terminating below the inlet substantially at a level where the inner and outer walls come very close to one another. The cold air flows through the narrow annular gap and is forced by this arrangement to flow tangentially along the inner wall of the cone.

Another example of the introduction of cold air into the discharge cone of a spray drying plant can be found in K. Kröll, Trocknungstechnik, Vol. 3, "Trocken und Trockner in Produktion (Drying and Dryers in Production)" by W. Kast et al., Springer Verlag 1989, page 188, FIG. 3.20. Coffee extract is dried in this spray drying tower. In this case, too, the cold air is introduced into the cone through a ring channel. Unfortunately, there are no further particulars in this document regarding the introduction of the cold air.

The introduction of cold air, even where it is made to float tangentially along the inner wall of the cone, is sufficient for conventional spray dryers operated with hot air as the drying medium. Dryers of this type normally work with an open discharge cone and, particularly in the spray drying of detergents and detergent ingredients, under a light reduced pressure to avoid the emission of dust to the outside. The extraneous air which thus flows into the drying tower from below has a whirling effect which prevents the development of excessive temperatures in the lower part of the spray dryer. In addition, the open discharge cone enables the dried product to be rapidly discharged so that its residence times in the lower part of the tower are brief.

Under these conditions, the above-mentioned injection of cold air into the discharge cone is sufficient to reduce the caking of soft and tacky products on the walls to such an extent that the product does not suffer unacceptable thermal damage. However, in the case of drying with circulated superheated steam under a light excess pressure, the known measures do not meet the requirement of ruling out substantial damage to the material being dried. High quality standards, particularly in the production of foods and detergents, are crucial in this regard.

Accordingly, in a drying process using superheated and circulated steam as the drying gas, the problem addressed by the present invention was to prevent the product from caking on the inner walls of the tower with an excessive residence time so that the product would not suffer any thermal damage.

DESCRIPTION OF THE INVENTION

According to the invention, the solution to this problem is characterized in that a) a fine water mist or steam with a temperature below the entry temperature of the superheated steam is introduced as auxiliary fluid into that part of the drying tower which is situated beneath the lowermost superheated steam inlet, b) the auxiliary fluid is allowed to flow through a double jacket with a permeable inner wall and c) the flow is guided tangentially to the inner wall.

The choice of a fine water mist or steam as the cooling and cleaning medium for the lower part of the drying tower and the tower walls avoids contamination of the steam atmosphere in the closed circulation system. The steam or water mist flowing through the double jacket first cools the inner wall in the discharge zone of the drying tower before the cooling fluid flows into the interior of the tower. The subsequent tangential flow prevents or at least reduces caking of the tacky material being dried. However, it is particularly favorable if the auxiliary fluid flows in intermittently, i.e. pulsatingly. Caking already present is blown away by the jet-like impact of the steam or water mist flowing tangentially to the inner wall. The jet-like impact of the auxiliary fluid which increases considerably with increasing rate of flow makes it possible to remove even firmly anchored deposits which continuously flowing steam would be unable to remove. The rate of flow which particularly determines the jet-like impact of the auxiliary fluid and also the pulse frequency may be adjusted in dependence upon the material to be dried and the other process conditions.

The temperature of the water mist or steam introduced is preferably selected in dependence upon the type and thickness of the caked deposits.

In one preferred embodiment of the invention, the auxiliary fluid is allowed to flow through a number of slots in the inner wall of the double jacket which are formed by scale-like overlapping of segments of the inner wall.

The auxiliary fluid introduced into the lower discharge end of the drying tower should generally not lead to further drying of the product particles. Accordingly, excessive overheating of the steam introduced should be avoided. The auxiliary fluid steam should therefore have a correspondingly high relative moisture content.

The auxiliary fluid, i.e. water mist or steam, can be prepared in various ways for use in the spray drying installation. In a preferred embodiment, however, the auxiliary fluid is steam and is taken from the steam circuit. The steam may be branched off, for example, from the external circuit between the condenser and the heater.

In one particular embodiment of the invention, the lower part of the tower and/or the product situated therein may be additionally cooled. In this embodiment, fine water mist or cooled steam is used as a cooling and cleaning medium for the lower part of the drying tower, i.e. for the space between the lowermost steam inlets and the bottom of the tower, and for the walls of the tower. The auxiliaries may be introduced, for example, via the cooled auxiliary fluid and also independently thereof. The use of the additional cooling medium provides for intensified and extremely rapid cooling of the tower and/or the product to be dried at least in the outer regions thereof in a very short time without any increase in the tackiness or the water content of the product. The overall balance of the drying process is also not affected by such small amounts of water introduced into the closed gas circuit. The water or cooled steam introduced may be discharged through the condensation stage of the drying steam circuit.

A temperature range of 100° to 150° C. and, more particularly, 110° to 120° C. is preferred where cooled steam is used. The steam may be of any origin, although it is preferably taken from the outer part of the steam circuit before the heater stage. In order to maintain the low temperature range required, it is favorable to introduce water and/or cooled steam in dependence upon the temperature prevailing in the lower part of the tower and, in particular, to establish a certain temperature or a certain temperature range. In another advantageous embodiment, the cooling medium (water and/or steam) is introduced through a ring of several nozzles arranged at uniform intervals around the tower cone at a certain height thereof in order to obtain uniform cooling over the cross-section of the cone. In a particularly suitable embodiment, the cooling medium is introduced through several nozzle rings arranged at different heights to achieve uniform cooling both over the cross-section and over the height of the lower part of the tower, namely the cone.

Although the invention has hitherto been described with reference to spray drying, the teaching of the invention is by no means confined to spray drying. Other drying processes which use the principle of a flowing gaseous drying medium can also make advantageous use of the teaching according to the invention. For example, drying may be carried out in a fluidized bed or on stationary and/or moving wet particles.

The invention concerns the application of the principle according to the invention to the drying of virtually any useful material and/or mixtures of thereof. In one particularly important embodiment, heat-sensitive wet products are dried at temperatures below 100° C. and under normal pressure. The application of the process according to the invention using an inert hot gas stream is generally important for the exhaust-free or exhaust-controlled drying of materials vulnerable to dust explosions and/or toxic materials and/or materials containing solvents and/or materials with a tendency towards pluming, more particularly from the field of wetting agents, detergents and cleaning products or ingredients thereof, fungicides, herbicides and insecticides and/or pharmaceutical or cosmetic auxiliaries and useful materials.

The embodiment where spray drying is carried out as the sole drying step or as part of a multistage drying process is of particular importance in the production of foods, including dairy products, cosmetics and auxiliaries for these fields of application.

Special examples for the food and dairy industry include the production of dried materials in powder form or agglomerate form from the fields of milk, baby foods, cheese/whey products, coffee whiteners, eggs, tomatoes, spice/herb extracts, soup mixtures, coffee/coffee substitute, coconut milk, flavorings, soya-based foods.

Examples of pharmaceutical products include analgesics, antibiotics, enzymes, plasma/plasma substitute, inoculants, vitamins, yeasts. Examples of products of the chemical industry from conventional processes of the generic type in question—apart from wetting agents, detergents and cleaning products and their ingredients—are, for example, catalysts, dyes/pigments, tanning agents, organic and inorganic fine chemicals, fungicides, herbicides, insecticides, fertilizers and the like. Examples of products from the ceramic industry include carbides, ferrites, nitrides, oxides, silicates, steatites and titanates. Polymer chemicals, such as urea/formaldehyde and melamine/formaldehyde resins, PVC, PMMA and the like, are also examples of the application of the teaching according to the invention.

We claim:

1. In a process for drying water-containing materials in a closed-circuit system using a vertical drying tower having inlets located at a lower portion of said tower, said inlets circulating superheated steam in countercurrent to said water-containing materials descending through said vertical drying tower thereby drying said water-containing materials, the improvement comprising:

(a) providing an auxiliary fluid having a temperature below that of said superheated steam entering into said vertical drying tower;

(b) providing a double jacket having a permeable inner wall, said double jacket surrounding said lower portion of said vertical drying tower below said inlets; and (c) introducing said auxiliary fluid through said permeable inner wall of said double jacket and into said vertical drying tower in a tangential or radial direction relative to said inner wall.

2. The process of claim 1 wherein said auxiliary fluid is introduced intermittently through said permeable inner wall of said double jacket and into said vertical drying tower.

3. The process of claim 1 wherein said auxiliary fluid comprises steam having a temperature of 100° C. to 150° C.

4. The process of claim 1 wherein said permeable inner wall of said double jacket comprises a plurality of slots formed by a scale-like overlapping of segments of said inner wall.

5. The process of claim 1 wherein said auxiliary fluid comprises finely sprayed water.

6. The process of claim 5 wherein said auxiliary fluid is sprayed intermittently into said lower portion of said vertical drying tower.

7. The process of claim 1 wherein in step (c) said auxiliary fluid is introduced through said permeable inner wall of said double jacket by a ring of nozzles arranged at regular intervals around said vertical drying tower in order to obtain uniform cooling over both a cross-section and height of said lower portion of said vertical drying tower.

8. The process of claim 7 wherein multiple rings of nozzles are provided at varying heights along said vertical drying tower.

9. The process of claim 1 wherein said water-containing materials are dried in said vertical drying tower at a temperature below 100° C. and at normal pressure.

10. The process of claim 1 wherein said water-containing materials are selected from the group consisting of wetting agents, builder components, detergent compositions, and mixtures thereof.

11. The process of claim 1 wherein said water-containing materials are products selected from the chemical, cosmetic, pharmaceutical, food, and dairy industry.

12. The product of the process of claim 1.
13. The product of the process of claim 2.
14. The product of the process of claim 3.
15. The product of the process of claim 4.
16. The product of the process of claim 5.
17. The product of the process of claim 6.
18. The product of the process of claim 9.
19. The product of the process of claim 10.
20. The product of the process of claim 11.

* * * * *